United States Patent
Shipley et al.

(10) Patent No.: US 9,439,240 B1
(45) Date of Patent: Sep. 6, 2016

(54) MOBILE COMMUNICATION SYSTEM IDENTITY PAIRING

(75) Inventors: Trevor D. Shipley, Olathe, KS (US); Robert L. Spanel, Overland Park, KS (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/218,503

(22) Filed: Aug. 26, 2011

(51) Int. Cl.
| | |
|---|---|
| *H04W 4/00* | (2009.01) |
| *H04W 88/08* | (2009.01) |
| *H04W 8/20* | (2009.01) |
| *H04W 8/18* | (2009.01) |
| *H04W 76/02* | (2009.01) |
| *H04M 1/60* | (2006.01) |

(52) U.S. Cl.
CPC .............. *H04W 88/08* (2013.01); *H04W 8/18* (2013.01); *H04W 8/20* (2013.01); *H04M 1/6041* (2013.01); *H04M 1/6075* (2013.01); *H04W 76/02* (2013.01)

(58) Field of Classification Search
CPC ........... H04M 1/6041; H04M 1/6075; H04M 1/6083; H04M 1/6091; H04M 1/7253; H04M 1/6066; H04M 2250/02; H04M 2250/60; H04W 4/008; H04W 28/14; H04W 76/02; H04W 8/18; H04W 8/20; H04W 8/205; H04W 88/10; H04W 88/04; H04W 88/06; H04W 92/18
USPC ............... 455/566, 567, 569.1, 569.2, 575.9, 455/152.1, 297, 345
See application file for complete search history.

(56) References Cited

U.S. PATENT DOCUMENTS

| | | |
|---|---|---|
| 5,892,900 A | 4/1999 | Ginter et al. |
| 6,622,083 B1 | 9/2003 | Knockeart et al. |
| 7,209,964 B2 | 4/2007 | Dugan et al. |
| 7,366,892 B2 | 4/2008 | Spaur et al. |
| 7,376,392 B2 | 5/2008 | Myojo |
| 7,454,473 B2 | 11/2008 | Suzuki |

(Continued)

FOREIGN PATENT DOCUMENTS

| | | |
|---|---|---|
| DE | 102011112546 A1 | 4/2014 |
| JP | 20062441 A | 9/2006 |

(Continued)

OTHER PUBLICATIONS

Ng, Sei Y., Patent Application entitled "Head Unit to Handset Interface and Integration," filed Sep. 27, 2011, U.S. Appl. No. 13/246,554.

(Continued)

*Primary Examiner* — Thai Vu (57) ABSTRACT

A system for emulating a mobile communication device comprising a first mobile communication device comprising a processor; a memory; an application stored in the memory that is operable to emulate an identity of a second mobile communication device; a transceiver configured to communicatively couple to the second mobile communication device and further configured to present the identity of the second mobile communication device to a wireless communication network; a temporary memory configured to store the identity of the second mobile communication device while the first mobile communication device is communicatively coupled to the second mobile communication device; a long-range antenna; and a short-range antenna.

19 Claims, 6 Drawing Sheets

(56) References Cited

U.S. PATENT DOCUMENTS

| | | |
|---|---|---|
| 7,912,224 B2 | 3/2011 | Lee et al. |
| 7,949,375 B2 | 5/2011 | Kortge |
| 7,966,111 B2 | 6/2011 | Moinzadeh et al. |
| 8,271,050 B2 | 9/2012 | Weiss |
| 8,417,823 B2 | 4/2013 | Luna et al. |
| 8,457,686 B2 | 6/2013 | Przybylski |
| 8,484,707 B1 | 7/2013 | Bertz et al. |
| 8,527,164 B2 | 9/2013 | Staudinger et al. |
| 8,548,532 B1 | 10/2013 | Ng |
| 8,606,335 B2 | 12/2013 | Ozaki |
| 8,626,152 B2 | 1/2014 | Farrell et al. |
| 8,630,747 B2 | 1/2014 | Burcham et al. |
| 8,676,199 B2 | 3/2014 | Madhavan et al. |
| 8,750,942 B1 | 6/2014 | Ng |
| 8,787,949 B2 | 7/2014 | Sumcad et al. |
| 8,994,591 B2 | 3/2015 | Dupray et al. |
| 9,002,574 B2 | 4/2015 | Garrett et al. |
| 9,031,498 B1 | 5/2015 | Bertz et al. |
| 9,032,547 B1 | 5/2015 | Hohler et al. |
| 9,110,774 B1 | 8/2015 | Bonn et al. |
| 9,173,238 B1 | 10/2015 | Bloomcamp et al. |
| 9,252,951 B1 | 2/2016 | Katzer et al. |
| 9,398,454 B1 | 7/2016 | Burcham et al. |
| 2003/0096641 A1* | 5/2003 | Odinak ............... 455/569 |
| 2003/0120601 A1 | 6/2003 | Ouye et al. |
| 2003/0224840 A1* | 12/2003 | Frank et al. ........... 455/575.9 |
| 2004/0044585 A1 | 3/2004 | Franco |
| 2004/0083041 A1 | 4/2004 | Skeen et al. |
| 2004/0125957 A1 | 7/2004 | Rauber et al. |
| 2004/0157650 A1 | 8/2004 | Wissinger et al. |
| 2005/0021744 A1 | 1/2005 | Haitsuka et al. |
| 2005/0065779 A1 | 3/2005 | Odinak |
| 2005/0113102 A1* | 5/2005 | Kwon et al. ............ 455/450 |
| 2006/0059480 A1 | 3/2006 | Kimoto |
| 2006/0143463 A1 | 6/2006 | Ikeda et al. |
| 2006/0154659 A1* | 7/2006 | Roter ............... H04W 8/205 455/422.1 |
| 2006/0168578 A1 | 7/2006 | Vorlicek |
| 2007/0028220 A1 | 2/2007 | Miller et al. |
| 2007/0086579 A1 | 4/2007 | Lorello et al. |
| 2007/0113269 A1 | 5/2007 | Zhang |
| 2007/0124043 A1 | 5/2007 | Ayoub et al. |
| 2007/0124045 A1 | 5/2007 | Ayoub et al. |
| 2007/0124046 A1 | 5/2007 | Ayoub et al. |
| 2007/0160199 A1 | 7/2007 | Sekiguchi et al. |
| 2007/0288423 A1 | 12/2007 | Kimoto |
| 2008/0034126 A1 | 2/2008 | Baker |
| 2008/0072047 A1 | 3/2008 | Sarikaya et al. |
| 2008/0148374 A1 | 6/2008 | Spaur et al. |
| 2008/0162676 A1 | 7/2008 | Magnusson |
| 2008/0289018 A1 | 11/2008 | Kawaguchi |
| 2008/0289044 A1 | 11/2008 | Choi |
| 2008/0307086 A1 | 12/2008 | Brooks et al. |
| 2009/0028082 A1 | 1/2009 | Wynn et al. |
| 2009/0049119 A1 | 2/2009 | Marcinkiewicz et al. |
| 2009/0109941 A1 | 4/2009 | Carter |
| 2009/0217036 A1 | 8/2009 | Irwin et al. |
| 2009/0287499 A1 | 11/2009 | Link, II |
| 2010/0097239 A1 | 4/2010 | Campbell et al. |
| 2010/0136944 A1 | 6/2010 | Taylor et al. |
| 2010/0197362 A1* | 8/2010 | Saitoh et al. ............. 455/569.2 |
| 2010/0220250 A1 | 9/2010 | Vanderwall et al. |
| 2010/0234071 A1 | 9/2010 | Shabtay et al. |
| 2010/0235285 A1 | 9/2010 | Hoffberg |
| 2010/0245122 A1 | 9/2010 | Haralson et al. |
| 2010/0260350 A1 | 10/2010 | Chutorash et al. |
| 2010/0285787 A1 | 11/2010 | Matsuda |
| 2011/0009107 A1 | 1/2011 | Guba et al. |
| 2011/0086668 A1 | 4/2011 | Patel |
| 2011/0090908 A1 | 4/2011 | Jacobson et al. |
| 2011/0099316 A1 | 4/2011 | Tseng et al. |
| 2011/0111728 A1 | 5/2011 | Ferguson et al. |
| 2011/0252415 A1 | 10/2011 | Ricci |
| 2011/0257973 A1 | 10/2011 | Chutorash et al. |
| 2011/0263293 A1 | 10/2011 | Blake et al. |
| 2011/0295444 A1 | 12/2011 | Westra et al. |
| 2011/0310731 A1 | 12/2011 | Park et al. |
| 2012/0028597 A1 | 2/2012 | Chmielewski et al. |
| 2012/0028607 A1 | 2/2012 | Tengler et al. |
| 2012/0028656 A1 | 2/2012 | Yi et al. |
| 2012/0109406 A1 | 5/2012 | Yousefi et al. |
| 2012/0127139 A1 | 5/2012 | Hayami et al. |
| 2012/0134497 A1 | 5/2012 | Roitshtein et al. |
| 2012/0142367 A1 | 6/2012 | Przybylski |
| 2012/0159638 A1 | 6/2012 | McDade, Sr. |
| 2012/0167071 A1 | 6/2012 | Paek |
| 2012/0183221 A1 | 7/2012 | Alasry et al. |
| 2012/0203557 A1 | 8/2012 | Odinak |
| 2012/0282895 A1 | 11/2012 | Bai et al. |
| 2012/0324046 A1 | 12/2012 | Park |
| 2013/0082820 A1 | 4/2013 | Tieman |
| 2013/0205026 A1 | 8/2013 | Ricci |
| 2013/0218400 A1 | 8/2013 | Knoop et al. |
| 2013/0226391 A1 | 8/2013 | Nordbruch et al. |
| 2013/0297456 A1 | 11/2013 | Annan et al. |
| 2014/0053261 A1 | 2/2014 | Gupta et al. |
| 2014/0068010 A1 | 3/2014 | Nicholson et al. |
| 2014/0087760 A1 | 3/2014 | Bennett |
| 2014/0128047 A1 | 5/2014 | Edwards et al. |
| 2014/0130036 A1 | 5/2014 | Gurikar et al. |
| 2014/0143354 A1 | 5/2014 | Tiernan |
| 2014/0222298 A1 | 8/2014 | Gurin |
| 2014/0222910 A1 | 8/2014 | Petersen et al. |
| 2014/0336919 A1 | 11/2014 | Li et al. |

FOREIGN PATENT DOCUMENTS

| | | |
|---|---|---|
| WO | 2013166418 A2 | 11/2013 |
| WO | 2013173331 A1 | 11/2013 |

OTHER PUBLICATIONS

Jason R. Delker, et al., Patent Application entitled "User Interface Update Signaling," filed Jun. 11, 2009, U.S. Appl. No. 12/483,135.

First Action Interview Pre-Communication dated Jan. 31, 2012, U.S. Appl. No. 13/246,554, filed Sep. 27, 2011.

FAIPP Office Action dated May 21, 2012, U.S. Appl. No. 13/246,554, filed Sep. 27, 2011.

Final Office Action dated Sep. 5, 2012, U.S. Appl. No. 13/246,554, filed Sep. 27, 2011.

Advisory Action dated Nov. 2, 2012, U.S. Appl. No. 13/246,554, filed Sep. 27, 2011.

Bertz, Lyle T., et al., Patent Application entitled "Secure Changing Auto-Generated Keys for Wireless Access," filed Jun. 9, 2011, U.S. Appl. No. 13/156,438.

Aboda, B., et al., "Exentsible Authentication Protocol (EAP)", Network Working Group, RFC 3748, Standards Track, Jun. 2004.

First Action Interview Pre-Interview Communication dated Oct. 26, 2012, U.S. Appl. No. 13/156,438, filed Jun. 9, 2011.

Office Action dated Dec. 5, 2012, U.S. Appl. No. 13/246,554, filed Sep. 27, 2011.

Bertz, Lyle T., et al. Patent Application entitled "Automotive Multi-Generation Connectivity," filed Apr. 26, 2011, U.S. Appl. No. 13/094,494.

Annan, Brandon C., et al. Patent Application entitled "Methods and Systems of Digital Rights Management for Vehicles," filed May 3, 2012, U.S. Appl. No. 13/463,799.

Burcham, Robert H., et al. Patent Application entitled "In-car Head unit Wireless Communication Service Subscription Initialization," filed Apr. 24, 2012, U.S. Appl. No. 13/455,121.

Burcham, Robert H., et al. Patent Application entitled "Alternative Authorization for Telematics," filed May 14, 2012, U.S. Appl. No. 13/471,107.

Bloomcamp, Eric Michael, et al. Patent Application entitled "Dual Path In-Vehicle Communication," filed Feb. 15, 2012, U.S. Appl. No. 13/769,268.

Bonn, Michael J., et al. Patent Application entitled "System and Method of Utilizing Driving Profiles via a Mobile Device," filed Mar. 15, 2012, U.S. Appl. No. 13/844,226.

(56) References Cited

OTHER PUBLICATIONS

Notice of Allowance dated Feb. 26, 2013, U.S. Appl. No. 13/156,438, filed Jun. 9, 2011.
Notice of Allowance dated May 20, 2013, U.S. Appl. No. 13/246,554, filed Sep. 27, 2011.
Office Action dated Mar. 13, 2013, U.S. Appl. No. 13/471,107, filed May 14, 2012.
Ng, Sei Y., Patent Application entitled "Head Unit to Handset Interface and Integration," filed Aug. 20, 2013, U.S. Appl. No. 13/971,658.
Bloomcamp, Eric M., et al., Patent Application entitled Authenticating Mobile Device for on Board Diagnostic System Access, filed Sep. 23, 2013, U.S. Appl. No. 14/034,475.
Notice of Allowance dated Aug. 26, 2013, U.S. Appl. No. 13/471,107, filed May 14, 2012.
Foreign Communication From a Related Counterpart Application, International Search Report and Written Opinion dated Jun. 13, 2013, International Application No. PCT/US13/40940 filed on May 14, 2013.
Foreign Communication From a Related Counterpart Application, International Search Report and Written Opinion dated Dec. 23, 2013, International Application No. PCT/US13/39514 filed on May 3, 2013.
First Action Interview Pre-Communication dated Nov. 15, 2013, U.S. Appl. No. 13/791,658, filed Aug. 20, 2013.
Notice of Allowance dated Jan. 30, 2014, U.S. Appl. No. 13/791,658, filed Aug. 20, 2013.
Office Action—Restriction Requirement dated May 7, 2014, U.S. Appl. No. 13/094,494, filed Apr. 26, 2011.
Katzer, Robin D., "Vehicle Key Function Control From a Mobile Phone Based on Radio Frequency Link From Phone to Vehicle," filed Jun. 13, 2014, U.S. Appl. No. 14/304,861.
Foreign Communication From a Related Counterpart Application, International Preliminary Report on Patentability dated Nov. 13, 2014, PCT/US13/39514 filed on May 3, 2013.
Foreign Communication From a Related Counterpart Application, International Preliminary Report on Patentability dated Nov. 27, 2014, PCT/US13/40940 filed on May 14, 2013.
Notice of Allowance dated Dec. 3, 2014, U.S. Appl. No. 13/094,494, filed Apr. 26, 2011.
First Action Interview Pre-Communication dated Dec. 1, 2014, U.S. Appl. No. 13/844,226, filed Mar. 15, 2013.
Notice of Allowance dated Jan. 6, 2015, U.S. Appl. No. 13/661,536, filed Oct. 26, 2012.
Supplemental Notice of Allowance dated Jan. 30, 2015, U.S. Appl. No. 13/661,536, filed Oct. 26, 2012.
Restriction Requirement dated Mar. 19, 2015, U.S. Appl. No. 13/463,799, filed May 3, 2012.
Final Office Action dated Mar. 17, 2015, U.S. Appl. No. 13/769,268, filed Feb. 15, 2013.
Notice of Allowance dated Mar. 12, 2015, U.S. Appl. No. 13/844,226, filed Mar. 15, 2013.
Amireddy, Sridhar Reddy, et al., Patent Application entitled, "Vehicle Remote Operations Control," filed Apr. 28, 2015, U.S. Appl. No. 14/698,522.

Office Action dated Aug. 28, 2014, U.S. Appl. No. 13/094,494, filed Apr. 26, 2011.
Office Action dated Aug. 12, 2014, U.S. Appl. No. 13/769,268, filed Feb. 15, 2013.
Office Action dated Jul. 14, 2014, U.S. Appl. No. 13/661,536, filed Oct. 26, 2012.
Hohler, Rick A., et al., Patent Application entitled "Provisioning Vehicle based Digital Rights Management for Media Delivered via Phone," filed Oct. 26, 2012, U.S. Appl. No. 13/662,536.
Finnerty, Brian J., et al., Patent Application entitled "Method for Authenticating Driver for Registration of In-Vehicle Telematics Unit," filed Oct. 31, 2014, U.S. Appl. No. 14/530,667.
Notice of Allowance dated Jun. 12, 2015, U.S. Appl. No. 13/769,268, filed Feb. 15, 2013.
First Action Interview Pre-Communication dated Jul. 9, 2015, U.S. Appl. No. 14/034,475, filed Sep. 23, 2013.
Restriction Requirement dated Feb. 24, 2015, U.S. Appl. No. 14/304,861, filed Jun. 13, 2014.
Office Action dated Jun. 30, 2015, U.S. Appl. No. 14/304,861, filed Jun. 13, 2014.
Restriction Requirement dated Sep. 4, 2015, U.S. Appl. No. 13/455,121, filed Apr. 24, 2012.
Office Action dated Sep. 9, 2015, U.S. Appl. No. 13/463,799, filed May 3, 2012.
Notice of Allowance dated Sep. 18, 2015, U.S. Appl. No. 14/304,861, filed Jun. 13, 2014.
Belkin, Wireless Network Access Point User Manual, published by Belkin Corporation, 2003, pp. 1-36.
Final Office Action dated Mar. 10, 2016, U.S. Appl. No. 13/463,799, filed May 3, 2012.
First Action Interview Pre-Communication dated Jan. 29, 2016, U.S. Appl. No. 13/455,121, filed Apr. 24, 2012.
Notice of Allowance dated Mar. 11, 2016, U.S. Appl. No. 13/455,121, filed Apr. 24, 2012.
Final Office Action dated Mar. 8, 2016, U.S. Appl. No. 14/034,475, filed Sep. 23, 2013.
Restriction Requirement dated Jan. 29, 2016, U.S. Appl. No. 14/703,997, filed May 5, 2015.
Amireddy, Sridhar Reddy, et al., Patent Application entitled, "Network Event Management Support for Vehicle Wireless Communication," filed May 5, 2015, U.S. Appl. No. 14/703,997.
Amireddy, Sridhar Reddy, et al., Patent Application entitled, "Vehicle Telematics Unit Communication Authorization and Authentication and Communication Service Provisioning," filed Aug. 8, 2015, U.S. Appl. No. 14/819,425.
Advisory Action dated May 20, 2016, U.S. Appl. No. 13/463,799, filed May 3, 2012.
Advisory Action dated Jun. 1, 2016, U.S. Appl. No. 14/034,475, filed Sep. 23, 2013.
First Action Interview Pre-Communication dated Apr. 25, 2016, U.S. Appl. No. 14/530,667, filed Oct. 31, 2014.
Notice of Allowance dated May 16, 2016, U.S. Appl. No. 14/703,997, filed May 5, 2015.

* cited by examiner

MOBILE COMMUNICATION SYSTEM IDENTITY PAIRING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of mobile devices may access a network, such as the Internet, via onboard (e.g. built-in) communication systems. These systems may operate off the internal battery of the mobile device, and may access networks via wireless connections with the aid of an onboard antenna. Access to networks may require a subscription account, which may permit access to communication services of specific communication equipment in given coverage areas.

SUMMARY

In an embodiment, a system for emulating a mobile communication device is disclosed. The system comprises a first mobile communication device comprising a processor; a memory; an application stored in the memory that is operable to emulate an identity (e.g. an ID) of a second mobile communication device; a transceiver configured to communicatively couple to the second mobile communication device and further configured to present the identity of the second mobile communication device to a wireless communication network; a temporary memory configured to store the identity of the second mobile communication device while the first mobile communication device is communicatively coupled to the second mobile communication device; a long-range antenna; and a short-range antenna.

In an embodiment, a method of emulating a mobile communication device is disclosed. The method comprises receiving, by a first mobile communication device, a request from a second mobile communication device to access a wireless communication network; coupling communicatively, by the first mobile communication device, to the second mobile communication device; requesting, by the first mobile communication device, an indicia of the second mobile communication device from the second mobile device; storing, in a temporary memory of the first mobile communication device, the indicia of the second mobile communication device while the second mobile communication device is proximate to the first mobile communication device; assuming, by the first mobile communication device, the identity of the second mobile communication device; accessing, by the first mobile communication device, a history of the second mobile communication device; accessing, by the first mobile communication device, a history and an address book of the second; presenting to the wireless communication network, by the first mobile communication device, the assumed identity of the second mobile communication device; conducting, by the first mobile communication device, a communication session with the wireless communication network, under the assumed identity of the second mobile communication device; and deleting the indicia of the second mobile communication device from the temporary memory of the first mobile communication device, when the second mobile communication device is no longer communicatively coupled to the first mobile communication device.

In an embodiment, a method of emulating a mobile communication device is disclosed. The method comprises detecting, by a first mobile communication device, a request from a second mobile communication device to access to a wireless communication network; communicatively coupling, by the first mobile communication device, to the second mobile communication device; requesting, by the first mobile communication device, indicia of the second mobile communication device from the second mobile device; receiving, by the first mobile communication device, the indicia of the second mobile communication device; assuming, by the first mobile communication device, the identity of the second mobile communication device; storing, in a temporary memory of the first mobile communication device, the indicia of the second mobile communication device while the second mobile communication device is communicatively coupled to the first mobile communication device; presenting to the wireless communication network the assumed identity of the second mobile communication device; conducting, by the first mobile communication device, a wireless communication session under the assumed identity of the second mobile communication device; terminating the assumption of the identity of the second mobile communication device by the first mobile communication device upon termination of the wireless communication session; and deleting the stored indicia of the second mobile communication device from the temporary memory of the first mobile communication device, when the second mobile communication device is no longer proximate to the first mobile communication device These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a system and methods of providing a mobile device with access to a wireless communication network is disclosed. A mobile device may access a network, such as the Internet, either by directly communicating with a base transceiver station (e.g. a cell tower), or by connecting through an access point which is then connected to a base transceiver station. If connecting directly to a base transceiver station, the mobile device may utilize the onboard wireless communication components and/or capabilities of the mobile device. If, however, access is via an access point, certain components of the access point may take on some of the functions that would otherwise be carried out by the mobile device. Herein, the terms emulate, mimic, simulate, clone and any other similar terms may be used interchangeably to describe the imitation (e.g. of a device by another device) such that a device such as an access point may present itself as if it were another device such as a mobile handheld unit. The means and rationale for doing so will be discussed in greater detail, below.

Access points may be wireless and may provide secured or unsecured access to a wireless communication network. The disclosure describes a system and method of providing access, on a temporary basis, to a mobile device via an access point. The disclosure further describes configuring an access point to emulate (e.g. mimic) a mobile device such that, to the wireless communication network, it appears as though the mobile device is connected directly (wirelessly) to the wireless communication network, and the existence of the access point is masked or otherwise shielded from the wireless communication network. By virtue of the present teachings, an access point may convince a wireless communication network the access point is, in fact, a mobile communication device that it is not (e.g. a cell phone). This may provide benefits to the mobile communication device that is being presented by the access point, as will be described in greater detail herein, below.

Connecting through the access point, whether or not spoofing is being practiced, may have several advantages. For example, the access point may be part of a vehicle, and as such may be tied into the vehicle's systems such that the access point is drawing power from the vehicle electrical system, as well as sending/receiving signals via the vehicle's antenna. The mobile device may establish and maintain a connection with the access point of the vehicle via reduced power, short-range communications protocols that may require less power than communicating directly with a wireless communication network. Thus the mobile device may benefit from using less of its own battery by relying on the access point to send/receive the communications between the mobile device and the wireless communication network utilizing the electrical power system of the vehicle. In addition, the antenna of the vehicle may provide improved signal transmitting and/or receiving capabilities, compared to the antenna of the mobile device. Thus the communications between the wireless communication network and the vehicle (and ultimately the mobile device) may be more efficient and also may lead to lower power consumption by the mobile device than if it were to connect directly to the wireless communications network using the mobile device's own internal system (e.g. internal battery and antenna). These and other benefits may be realized when connecting a mobile device to a wireless communication network via an access point, using the teachings of the present disclosure. In other embodiments, the access point may be any type or form of access point, and may not necessarily be associated with a vehicle.

In an embodiment, when an owner of the automobile offers a ride to a friend (i.e. a passenger), the passenger may wish to have access to an access point provided within the vehicle, in order to access the Internet with their mobile device. The passenger may attempt to access the Internet via the access point of the automobile. The access point may detect the attempt and may respond by requesting the identity of the mobile device. The identity of the mobile device may be provided as any form of indicia, for example a media access control (MAC) address, a mobile equipment identifier (MEID), a mobile station identifier (MSID), a mobile directory number (MDN), a network access identifier (NAI), or other form of identity or indicia. The mobile device may respond to the access point with a reply that contains the requested indicia of the mobile device. The access point then may receive the reply containing the indicia of the mobile device, store the indicia in a temporary memory, and may utilize the indicia of the mobile device to emulate the mobile device. Utilizing the indicia of the mobile device may permit the access point to present itself to the wireless communication network as if it were the mobile device itself, when connecting the mobile device to a wireless communication network. In this way, the access point is essentially invisible and/or unknown to the wireless communication network. This may permit the user of the mobile device to access the functions and/or features of the service provider associated with the mobile device, and not the service provider of the access point. In this way, if multiple passengers with mobile devices, each of which may have different service providers, may each access their own provider services by allowing the access point to present the identities of their mobile devices to the communication network, thereby leading the network to believe that it is directly communicating with the individual mobile devices, themselves.

The access point may further access the history of the mobile device, the address of the mobile device, and/or other assets of the mobile device then to more fully present the access point to the wireless communication network as if the access point were, in fact, the mobile device itself. Accessing the assets of the mobile device also may provide the user of the mobile device with an added convenience, in that the user of the mobile device may be able to interact with an interface associated with the access point (e.g. a head unit of a vehicle), while still having access to the assets of the mobile device without having to copy over or otherwise synchronize these assets with the access point. This may avoid the inconvenience of having to generate additional copies, for example, of the address book of the mobile device on the access point, and may obviate the need to periodically re-copy or re-synchronize the address book.

Utilizing the head unit of the vehicle also may provide the mobile device user with a more easily manipulated user interface, such as larger keys than those of the mobile device, a touch-screen interface, voice-activated interface, audio system, or other such user interface features that may be more convenient that utilizing the user interface and/or input/outputs of the mobile device itself.

Figure 1:
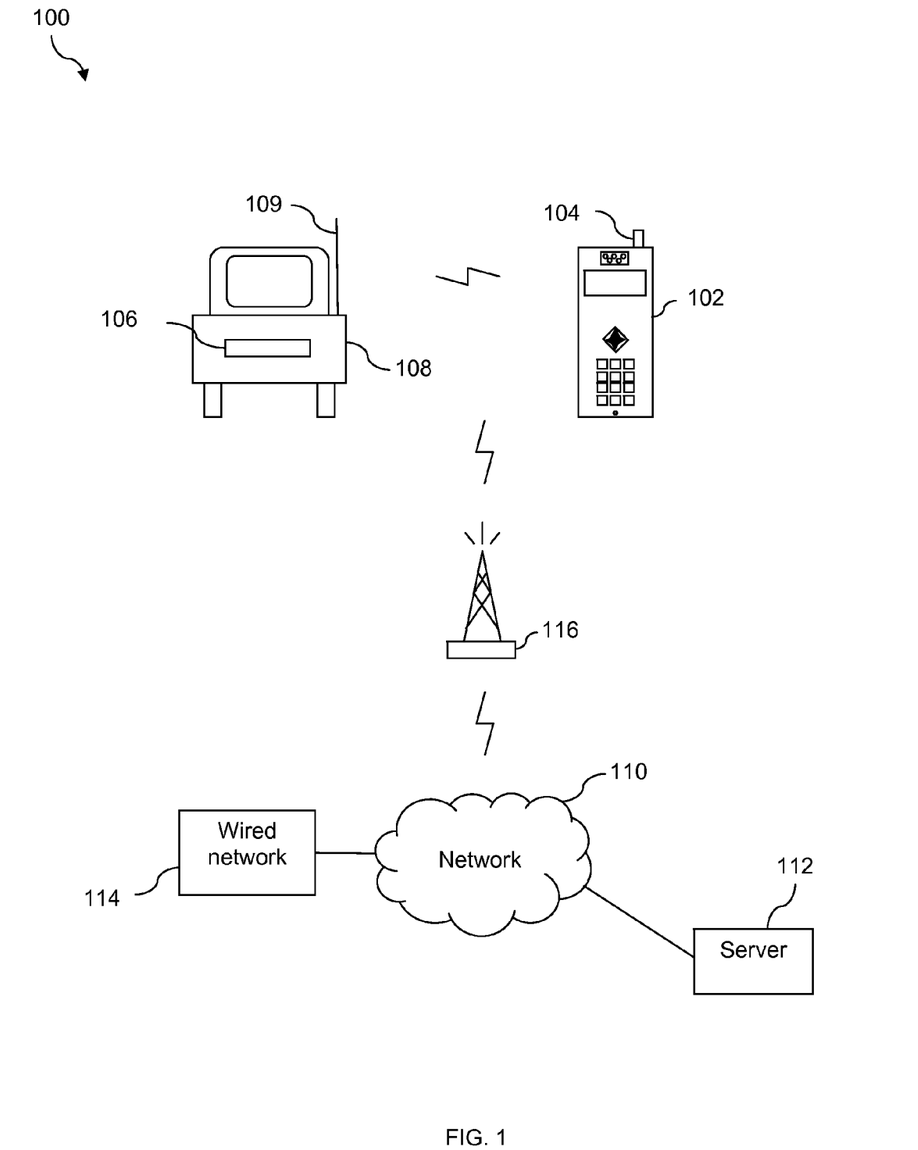
FIG. 1 illustrates a wireless communication system, according to an embodiment of the disclosure.

Turning now to FIG. 1, a network access system 100 is illustrated. System 100 comprises a mobile device 102 with an antenna 104, a vehicle 108 with an antenna 109, an access point 106, a network 110, a server 112, a wired network 114, and a base transceiver station (BTS) 116. As illustrated in FIG. 1, access point 106 may be located within and/or integrated into vehicle 108. Alternatively, access point 106 may be a separate standalone unit, such as an access point within a business establishment such as a coffee shop, a restaurant, a hotel, or such. The access point 106 may be configured to connect wirelessly to the network 110, via BTS 116. Connecting with network 110 may provide access to other resources connected thereto, wirelessly or otherwise, such as server 112 and/or wired network 114.

While illustrated as a mobile phone, mobile device 102 may be any form of mobile device such as a mobile phone, a wireless handset, a pager, a personal digital assistant (PDA), a gaming device, an inventory control device, a media player, a portable computer, a tablet computer, a netbook computer, a laptop computer, and/or other form of wireless mobile device. As such, mobile device 102 may be configured to connect wirelessly to a network via, for example, BTS 116, in a manner similar to that of access point 106. Mobile device 102 therefore may be availed of the same resources of network 110 as access point 106, in a similar fashion.

Likewise, while illustrated as part of vehicle 108, access point 106 may be a separate access point, which may or may not be part of a vehicle. In an embodiment, access point 106 may be any type of mobile device capable of providing the services and offerings of an access point, as would be well known to one of ordinary skill in the art.

Figure 2:
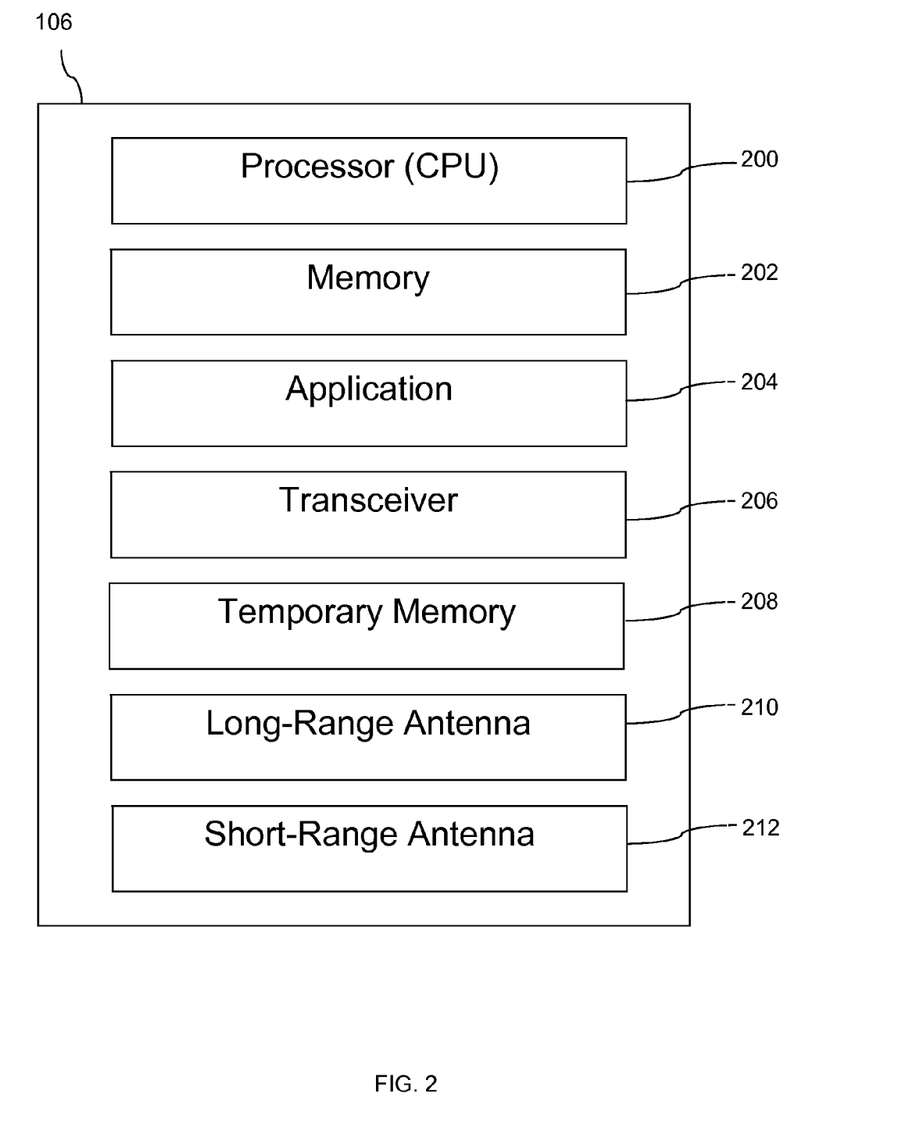
FIG. 2 illustrates a wireless mobile communication device, according to an embodiment of the disclosure.

FIG. 2 illustrates additional details of access point 106. Access point 106 comprises a processor 200, which may be referred to as a central processing unit (CPU) 200, a memory 202, an application 204, a transceiver 206, a temporary memory 208, a long-range antenna 210, and a short-range antenna 212. CPU 200 may be any processor capable of providing suitable functionality for access point 106. CPU 200 may be configured to carry out the instructions of a computer program, such as application 204, described in greater detail below. CPU 200 may carry out each instruction of application 204 in sequence, in order to perform the basic operations of access point 106. CPU's such as CPU 200 are well known to those of ordinary skill in the art, and will not be described or discussed in further detail herein.

Memory 202 may be any form of memory, such as random access memory (RAM), and may allow stored data to be accessed in any order, regardless of its physical location and whether it is related to the previous piece of data. RAM may be one or more volatile types of memory, such as dynamic RAM (DRAM), flash memory, or other such memory, and may be arranged and configured to store information, data, and/or software such as application 204 and to then provide application 204 to CPU 200 for execution.

Application 204 may comprise any software and/or firmware used to facilitate the functionality of access point 106, with respect to providing network connectivity to a mobile device. Application 204 may comprise a compiled set of machine-readable instructions that configure the access point 106 to provide the desired functionality, or the application software may be high-level software instructions to be processed by an interpreter or compiler to indirectly configure the access point 106. In an embodiment, application 204 may be or may contain a rules engine or such that may monitor a rule that is setup to permit access to another device, such as a mobile device.

Transceiver 206 may be a wireless system, similar to that of a mobile communications device such as mobile device 102, and may be arranged and configured to communicate wirelessly with, for example, a mobile device such as a mobile phone, a base transceiver station such as BTS 116, and/or other type of wireless communication device. Wireless telecommunications between mobile devices and base transceiver stations are well known to those of ordinary skill in the art. Embodiments of access point 106 are discussed in greater detail herein below.

Temporary memory 208 may be RAM, as described above, or similar such memory, and may be configured, for example, to temporarily store indicia of a mobile communication device such as mobile device 102. Temporary memory 208 may be further configured to irreversibly and/or permanently erase the indicia, such that it is not recoverable, once the need to store it has passed. This may add a level of security for a user, such that they do not leave an electronic trail of information behind them. These and other functions of memory such as temporary memory 208 are also well known to those of ordinary skill in the art, and will not be discussed in further detail, herein.

In an embodiment mobile device 102 may be used by a passenger in a vehicle such as vehicle 108. The passenger may wish to connect to a network, such as network 110, via a mobile phone, such as mobile device 102. The passenger may initiate a phone call, open a web browser on mobile device 102, or other such initiation of a session that may require wireless communication with network 110. When, for example, mobile device 102 opens the web browser, access point 106 may detect and intercept the network access attempt by mobile device 102. Communication protocol between mobile device 102 and access point 106 may be by any suitable method, for example Bluetooth technology, Code division multiple access (CDMA), WiFi, or such. Access point 106 may request (e.g. query) mobile device 102 for a form of indicia of mobile device 102. The indicia may be a form of unique identifier that of mobile device 102, such as a media access control (MAC) address, a mobile equipment identifier (MEID), a mobile station identifier (MSID), a mobile directory number (MDN), a network access identifier (NAI), or other form of identity or indicia to identify mobile device 102. The indicia may be transmitted from mobile device 102 by any means, for example by multimedia messaging service (MMS) (e.g. text message), email, handshaking protocol, or other wireless transfer protocol that may be suitable for the situation. The indicia of mobile device 102 may be received by access point 106 via transceiver 206 and short-range antenna 212, which may require that mobile device 102 be proximate to access point 106, as the range of short-range antenna 212 may be relatively short. Mobile device 102, for example, may need to be within about 2 feet, within about 5 feet, or within about 10 feet from access point 106, in order to receive the indicia of mobile device 102. Access point 106 may then store the indicia in temporary memory 208.

Application 204 may then access the indicia of mobile device 102 from temporary memory 208. Access point 106 may then contact BTS 116, and may initiate a handshaking protocol in order to establish a communication channel with network 110, via BTS 116. Access point 106 may communicate with BTS 116 via any suitable protocol, such as CDMA or GSM, for example. During handshaking, access point 106 may present the indicia of mobile device 102 such that BTS 116 is not aware that it is communicating with access point 106, as it would appear as though BTS 116 is actually communicating directly with mobile device 102, by virtue of access point 106 presenting the indicia of mobile device 102 to BTS 116. In this manner, access point 106, in essence, may emulate or mimic mobile device 102 (e.g. spoofing).

In an alternative embodiment, mobile device 102 may directly contact access point 106 in order to initiate a session with network 110, rather than having access point 106 detect and intercept the attempt by mobile device 102 to access network 110. This embodiment may represent an intentional desire on the part of a user of mobile device 102 to realize the benefits of having access point 106 mimic the identity of mobile device 102.

This scenario may provide several benefits. For example, for mobile device 102 to wirelessly communicate with access point 106, it may require that the two units are proximate to each other. This proximity may utilize less signal strength from mobile device 102, which may therefore consume less power from mobile device 102. This may provide the benefit of extending the battery life of mobile device 102. Battery life may be an important determining factor in the consumer experience of using a mobile device such as mobile device 102. That is to say, battery life may be one of the features of merit that a consumer may consider important when selecting and/or using a mobile device such as mobile device 102.

For example, a user of mobile device 102 may charge mobile device 102 overnight, and then use mobile device 102 throughout the day, thereby consuming the power stored in, for example, an onboard battery of mobile device 102. Due to the limitations of the onboard battery of mobile device 102 and the utilization habits of the user of mobile device 102, the battery mobile device 102 may run out of power before the end of the day, which may leave the user without the ability to use mobile device 102. This may be a substantial inconvenience to the user, and may lead to a negative user experience, which may in turn lead to a user discarding mobile device 102 and switching to another mobile device, which can cause a carrier and/or a producer of mobile device 102 to lose customers and/or market share.

In an embodiment, mobile device 102 may communicate with BTS 116 through access point 106, in essence, shifting the workload of the communication to the power supply of access point 106, which may be tied into or otherwise associated with a vehicle such as vehicle 108. Vehicle 108 may have onboard power generation capabilities (e.g. an alternator or generator), and hence a reduced chance of power loss due to battery limitations. The onboard power supply of vehicle 108 may be provided to access point 106, by virtue of being connected thereto. Thus, as described above, this may lead to a reduction of the consumption of the power stored in the onboard battery of mobile device 102, thereby providing the user with an improvement in the usable lifetime of mobile device 102 during the course of the day, thereby resulting in a positive user experience for the user of mobile device 102.

In an embodiment, other benefits may be realized by practicing the teachings of the disclosure. For example, the antenna 109 of vehicle 108 may be larger and more efficient than the antenna 104 of mobile device 102, with respect to sending and/or receiving signals from a wireless communication system. This may provide mobile device 102 with more effective and/or efficient wireless communication, again without consuming excess battery power that may be associated with trying to communicate with a wireless communication system via the smaller, less efficient antenna 104 of mobile device 102. For example, antenna 109 may provide longer range signal broadcast and/or reception than antenna 104. Antenna 109 also may provide a better communication channel and/or a higher bandwidth channel than antenna 104. These benefits may result in an improved user experience via increased signal efficiency and the concomitant reduction in power consumption associated thereto.

Yet another benefit of the teachings of the disclosure may be realized when, for example, mobile device 102 has subscriber service with a particular service provider, and access point 106 does not have the same provider service. For example, if mobile device 102 has a subscription plan for network access with provider A, and access point 106 has service through provider B, access point 106 may be able to (by way of mimicking mobile device 102) avail mobile device 102 of the service plan advantages of provider A by presenting access point 106 as if it were mobile device 102. In this example, access point 106 may lead the BTS 116 to believe that access point 106 is actually mobile device 102, and BTS 116 may permit access to the network 110, based on the wireless service subscription plan of mobile device 102, regardless of whether or not access point 106 has the same service. In an embodiment, this scenario may actually lead to a different base transceiver station (e.g. the base transceiver station associated with the service provider A) picking up and carrying the communication of mobile device 102, via access point 106, even though this particular base transceiver station would not normally respond to a communication request from access point 106, due to the fact that access point 106 would not be considered a customer.

Figure 3:
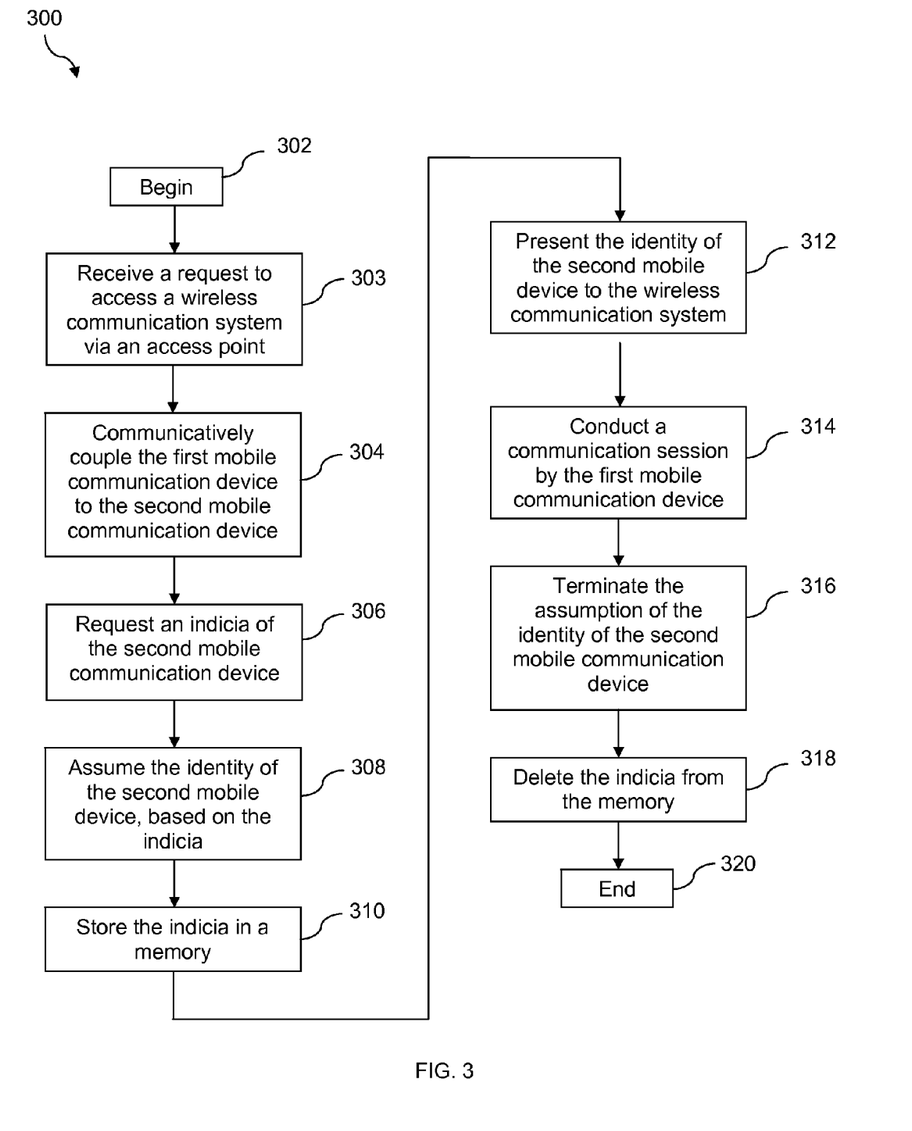
FIG. 3 illustrates a flowchart according to an embodiment of the disclosure.

FIG. 3 illustrates a method 300 of the disclosure. In step 302, the method begins. In step 303, a mobile device receives a request to access a network such as network 110. In an embodiment, an access point such as access point 106 may be a mobile device, as it may be deployed within a vehicle such as vehicle 108. Access point 106 may receive the request for access to network 110 from a second mobile device such as mobile device 102. In step 304, access point 106 may communicatively couple with mobile device 102. Such coupling may be by, for example, a handshaking protocol which may dynamically set parameters of a communications channel established between access point 106 and mobile device 102, before normal communication over the channel begins. Communicative coupling may be established by any suitable protocol, such as would be known to one of ordinary skill in the art.

In step 306, access point 106 may request indicia of mobile device 102. In an embodiment, this request may be via any means suitable, as one of ordinary skill in the art would know. Likewise, the response from mobile device 102 to access point 106, containing the indicia, may also be by any suitable method or means to achieve a desired result. A unique identifier (i.e. indicia) of mobile device 102 may be communicated to access point 106. The indicia may also contain security tokens or other information, as one of ordinary skill in the art would realize.

At step 308, access point 106 may assume the identity of mobile device 102. That is to say, access point 106 may hereafter present itself as mobile device 102 by virtue of the indicia of mobile device 102, as will be explained in greater detail, below.

At step 310, access point 106 may store the indicia of mobile device 102 in a memory such as temporary memory 208. The storing may be to permit ongoing access to the indicia of mobile device 102, until such time as retention of the indicia is no longer required or appropriate. For example, access point 106 may store the indicia in temporary memory 208 in order to reestablish a wireless connection, should the connection be inadvertently severed, dropped, or otherwise terminated. Once a wireless session is over, for example when mobile device 102 manually terminates the session, or moves to a distance that is too great to maintain contact with access point 106, the indicia of mobile device 102 that is stored in temporary memory 208 may be erased from temporary memory 208. In an embodiment, temporary memory 208 may irretrievably erase the indicia of mobile device 102, so as to prevent accidental sharing of the indicia.

In step 312, by way of presenting the indicia of mobile device 102 to a wireless communication unit such as BTS 116, access point 106 may mimic or emulate mobile device 102. In effect, access point 106 may give BTS 116 indication, by presentation of the indicia of mobile device 102, that access point actually is mobile device 102. Access point 106 also may withhold presentation of the indicia of access point 106, and may selectively present the indicia of mobile device 102, such that BTS 116 has no indication of the existence of access point 106.

At step 314, mobile device 102 may conduct a communication session such as a voice phone call, an Internet browser session, a text message communication, or such, via the connection established between access point 106, BTS 116, and thereby to network 110. At step 316, the communication session may be terminated. Session termination may be manual, such as by making a selection from a menu provided by mobile device 102, by turning off mobile device 102, by closing a web browser, by terminating a phone call, or by other suitable means of terminating a session.

At step 318, access point 106 may delete the indicia of mobile device 102 from temporary memory 208. As described above, the indicia may be permanently removed from temporary memory 208, to prevent accidental or unauthorized user thereof. At step 320 the method end.

Figure 4:
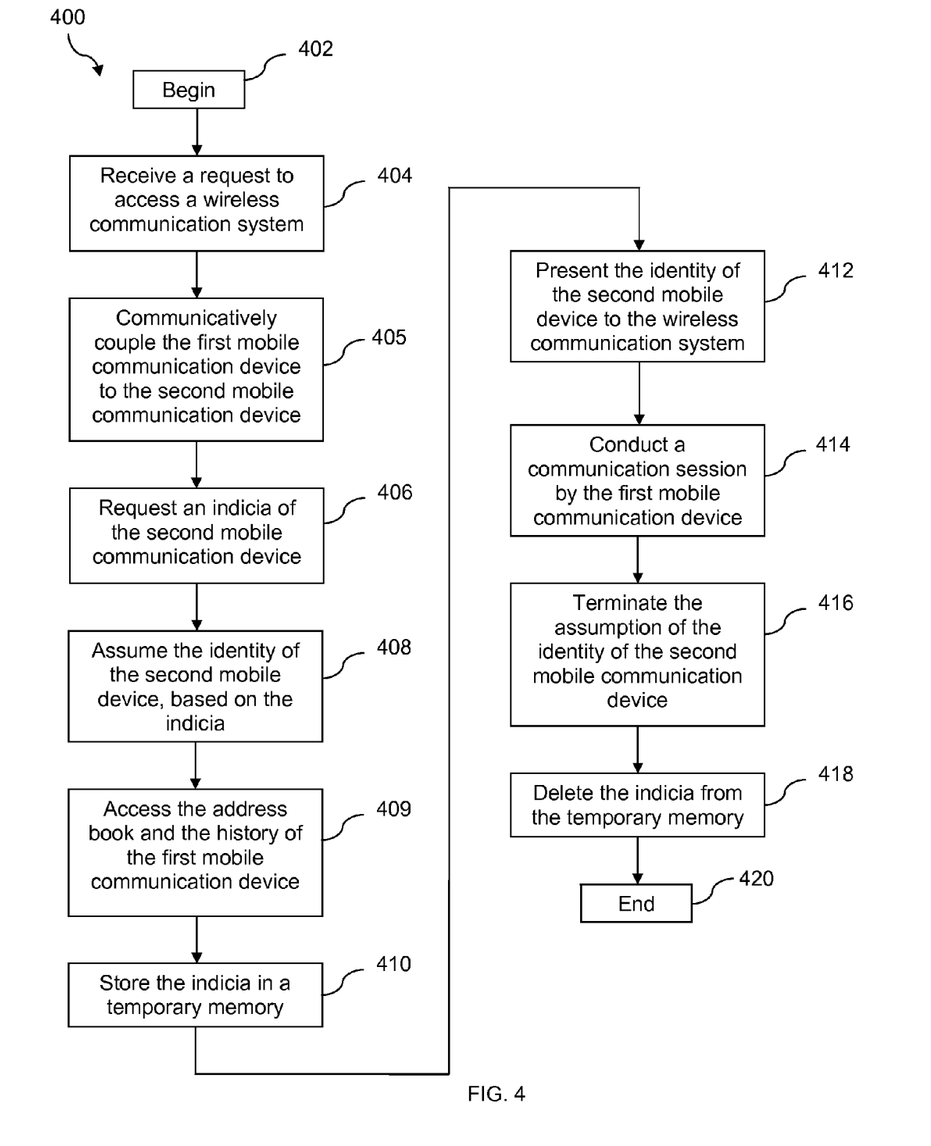
FIG. 4 illustrates a flowchart according to an embodiment of the disclosure.

FIG. 4 illustrates a method 400 of the disclosure. In step 402, the method begins. In step 404, a mobile device receives a request to access a network such as network 110. In an embodiment, an access point such as access point 106 may be a mobile device, as it may be deployed within a vehicle such as vehicle 108. Access point 106 may receive the request for access to network 110 from a second mobile device such as mobile device 102. In step 405, access point 106 may communicatively couple with mobile device 102. Such coupling may be by, for example, a handshaking protocol which may dynamically set parameters of a communications channel established between access point 106 and mobile device 102, before normal communication over the channel begins. Communicative coupling may be established by any suitable protocol, such as would be known to one of ordinary skill in the art.

In step 406, access point 106 may request indicia of mobile device 102. In an embodiment, this request may be via any means suitable, as one of ordinary skill in the art would know. Likewise, the response from mobile device 102 to access point 106, containing the indicia, also may be by any suitable method or means to achieve a desired result. A unique identifier (i.e. indicia) of mobile device 102 may be communicated to access point 106. The indicia may also contain security tokens or other information, as one of ordinary skill in the art would realize.

At step 408, access point 106 may assume the identity of mobile device 102. That is to say, access point 106 may hereafter present itself as mobile device 102 by virtue of the indicia of mobile device 102, as will be explained in greater detail, below.

At step 409, access point 106 may access the address book and the history of mobile device 102. In this way, access point 106 may be availed of the contact information provided in the address book of the mobile device 102 to, for example, place phone calls by entering the name of a person to whom a user may desire to place a call. In addition, by accessing the history of the first mobile communication device, access point 106, for example, may be able to redial recently dialed phone numbers of the mobile device 102. Because of the ability to access the resources of mobile device 102 (e.g. the address book and history), access point 106 may facilitate improved utilization of the features of mobile device 102 via access point 106, which may provide an improved user experience for a user of mobile device 102.

At step 410, access point 106 may store the indicia of mobile device 102 in a memory such as temporary memory 208. The storing may be to permit ongoing access to the indicia of mobile device 102, until such time as retention of the indicia is no longer required or appropriate. For example, access point 106 may store the indicia in temporary memory 208 in order to reestablish a wireless connection, should the connection be inadvertently severed, dropped, or otherwise terminated. Once a wireless session is over, for example when mobile device 102 manually terminates the session, or moves to a distance that is too great to maintain contact with access point 106, the indicia of mobile device 102 that is stored in temporary memory 208 may be erased from temporary memory 208. For example, in an embodiment, the communication session may be terminated when the mobile device 102 leaves the vicinity of the access point 106, for example, when the access point 106 determines that a radio signal strength received by the access point 106 drops below a threshold. In an embodiment, temporary memory 208 may irretrievably erase the indicia of mobile device 102, so as to prevent accidental sharing of the indicia.

In step 412, by way of presenting the indicia of mobile device 102 to a wireless communication unit such as BTS 116, access point 106 may mimic or emulate mobile device 102. In effect, access point 106 may give BTS 116 indication, by presentation of the indicia of mobile device 102, that access point actually is mobile device 102. Access point 106 may also withhold presentation of the indicia of access point 106, and may selectively present the indicia of mobile device 102, such that BTS 116 has no indication of the existence of access point 106.

At step 414, mobile device 102 may conduct a communication session such as a voice phone call, an Internet browser session, a text message communication, or such, via the connection established between access point 106, BTS 116, and thereby to network 110. At step 416, the communication session may be terminated. Session termination may be manual, such as by making a selection from a menu provided by mobile device 102, by turning off mobile device 102, by closing a web browser, by terminating a phone call, or by other suitable means of terminating a session.

At step 418, access point 106 may delete the indicia of mobile device 102 from temporary memory 208. As described above, the indicia may be permanently removed from temporary memory 208, to prevent accidental or unauthorized user thereof. For example, the memory location or locations into which the indicia has been written may be intentionally overwritten with other information and/or characters to thereby remove any record of the indicia. This may prevent unauthorized use of the indicia by, for example, an identity thief that may somehow access the indicia, should it remain in the memory. At step 420 the method ends.

Figure 5:
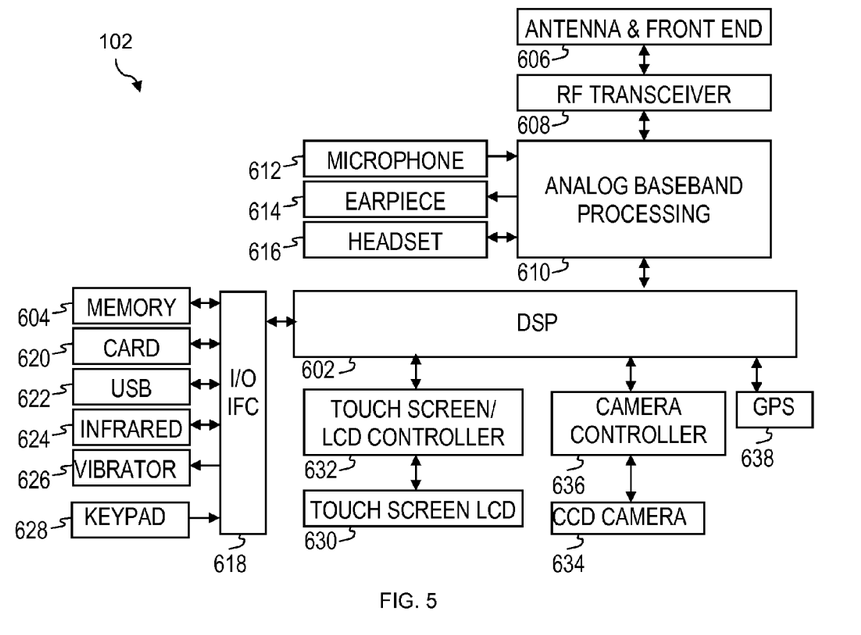
FIG. 5 illustrates a block diagram of a mobile device, according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 602 and a memory 604. As shown, the mobile device 102 may further include an antenna and front end unit 606, a radio frequency (RF) transceiver 608, an analog baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a charge-coupled device (CCD) camera 634, a camera controller 636, and a global positioning system (GPS) sensor 638. In an embodiment, the mobile device 102 may include another kind of display that does not provide a touch sensitive screen. In an embodiment, the DSP 602 may communicate directly with the memory 604 without passing through the input/output interface 618.

The DSP 602 or some other form of controller or central processing unit operates to control the various components of the mobile device 102 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the mobile device 102 to function as a peripheral device to exchange information with a personal computer or other computer system. The infrared port 624 and other optional ports such as a Bluetooth interface or an IEEE 802.11 compliant wireless interface may enable the mobile device 102 to communicate wirelessly with other nearby handsets and/or wireless base stations.

The keypad 628 couples to the DSP 602 via the interface 618 to provide one mechanism for the user to make selections, enter information, and otherwise provide input to the mobile device 102. Another input mechanism may be the touch screen LCD 630, which may also display text and/or graphics to the user. The touch screen LCD controller 632 couples the DSP 602 to the touch screen LCD 630.

Figure 6:
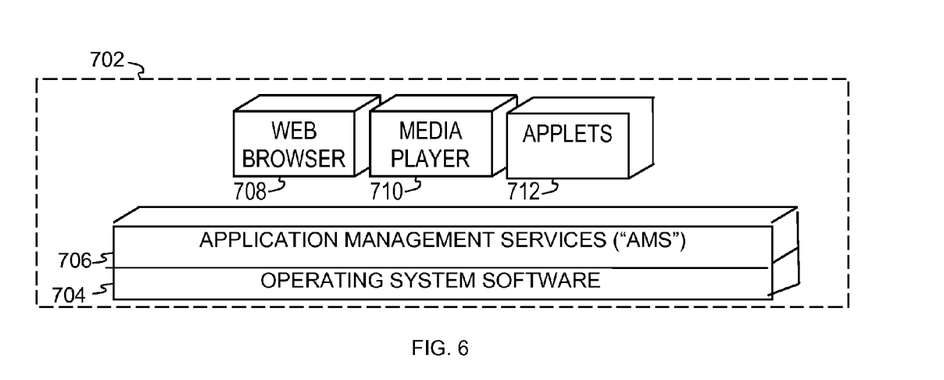
FIG. 6 illustrates a software environment, according to an embodiment of the disclosure.

FIG. 6 illustrates a software environment 702 that may be implemented by the DSP 602. The DSP 602 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services ("AMS") 706 that transfer control between applications running on the mobile device 102. Also shown in FIG. 6 are a web browser application 708, a media player application 710, and JAVA applets 712. The web browser application 708 configures the mobile device 102 to operate as a web browser, allowing a user to enter information into forms and select links to retrieve and view web pages. The media player application 710 configures the mobile device 102 to retrieve and play audio or audiovisual media. The JAVA applets 712 configure the mobile device 102 to provide games, utilities, and other functionality.

Figure 7:
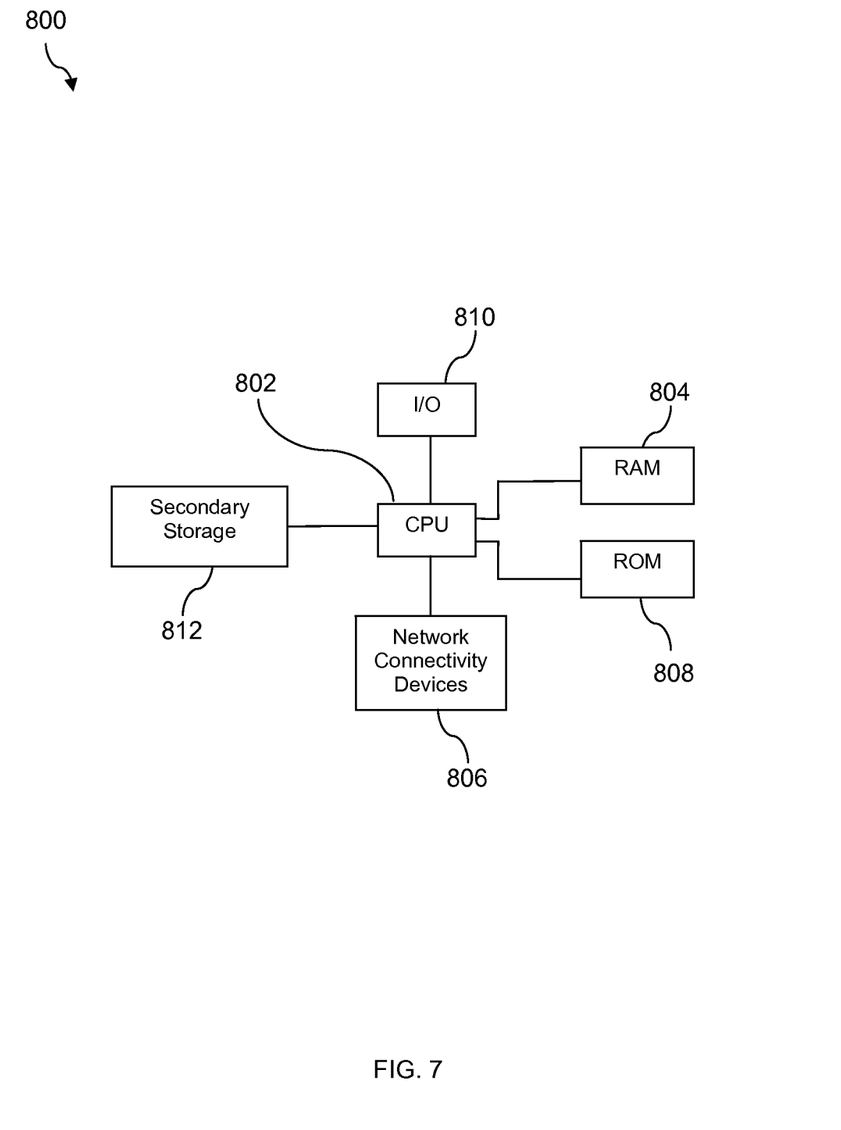
FIG. 7 illustrates a computer system, according to an embodiment of the disclosure.

FIG. 7 illustrates a computer system 800 suitable for implementing one or more embodiments disclosed herein. The computer system 800 includes a processor 802 (which may be referred to as a central processor unit or CPU) that is in communication with memory devices including secondary storage 812, read only memory (ROM) 808, random access memory (RAM) 804, input/output (I/O) devices 810, and network connectivity devices 806. The processor 802 may be implemented as one or more CPU chips.

It is understood that by programming and/or loading executable instructions onto the computer system 800, at least one of the CPU 802, the RAM 804, and the ROM 808 are changed, transforming the computer system 800 in part into a particular machine or apparatus having the novel functionality taught by the present disclosure. It is fundamental to the electrical engineering and software engineering arts that functionality that may be implemented by loading executable software into a computer may be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 812 is typically comprised of one or more disk drives or tape drives and is used for non-volatile storage of data and as an over-flow data storage device if RAM 804 is not large enough to hold all working data. Secondary storage 812 may be used to store programs which are loaded into RAM 804 when such programs are selected for execution. The ROM 808 is used to store instructions and perhaps data which are read during program execution. ROM 808 is a non-volatile memory device which typically has a small memory capacity relative to the larger memory capacity of secondary storage 812. The RAM 804 is used to store volatile data and perhaps to store instructions. Access to both ROM 808 and RAM 804 is typically faster than to secondary storage 812. The secondary storage 812, the RAM 804, and/or the ROM 808 may be referred to in some contexts as computer readable storage media and/or non-transitory computer readable media.

I/O devices 810 may include printers, video monitors, liquid crystal displays (LCD's), touch screen displays, keyboards, keypads, switches, dials, mice, track balls, voice recognizers, card readers, paper tape readers, or other well-known input devices.

The network connectivity devices 806 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 806 may enable the processor 802 to communicate with the Internet or one or more intranets. With such a network connection, it is contemplated that the processor 802 might receive information from the network, or might output information to the network in the course of performing the above-described method steps. Such information, which is often represented as a sequence of instructions to be executed using processor 802, may be received from and outputted to the network, for example, in the form of a computer data signal embodied in a carrier wave.

Such information, which may include data or instructions to be executed using processor 802 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 802 executes instructions, codes, computer programs, scripts which it accesses from hard disk, floppy disk, optical disk (these various disk based systems may all be considered secondary storage 812), ROM 808, RAM 804, or the network connectivity devices 806. While only one processor 802 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 812, for example, hard drives, floppy disks, optical disks, and/or other device, the ROM 808, and/or the RAM 804 may be referred to in some contexts as non-transitory instructions and/or non-transitory information.

In an embodiment, the computer system 800 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 800 to provide the functionality of a number of servers that is not directly bound to the number of computers in the computer system 800. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 800, at least portions of the contents of the computer program product to the secondary storage 812, to the ROM 808, to the RAM 804, and/or to other non-volatile memory and volatile memory of the computer system 800. The processor 802 may process the executable instructions and/or data structures in part by directly accessing the computer program product, for example by reading from a CD-ROM disk inserted into a disk drive peripheral of the computer system 800. Alternatively, the processor 802 may process the executable instructions and/or data structures by remotely accessing the computer program product, for example by downloading the executable instructions and/or data structures from a remote server through the network connectivity devices 806. The computer program product may comprise instructions that promote the loading and/or copying of data, data structures, files, and/or executable instructions to the secondary storage 812, to the ROM 808, to the RAM 804, and/or to other non-volatile memory and volatile memory of the computer system 800.

In some contexts, the secondary storage 812, the ROM 808, and the RAM 804 may be referred to as a non-transitory computer readable medium or a computer readable storage media. A dynamic RAM embodiment of the RAM 804, likewise, may be referred to as a non-transitory computer readable medium in that while the dynamic RAM receives electrical power and is operated in accordance with its design, for example during a period of time during which the computer 800 is turned on and operational, the dynamic RAM stores information that is written to it. Similarly, the processor 802 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for connecting a mobile communication device to a wireless communication network comprising:
    an access point comprising:
        a processor;
        a non-transitory memory;
        a short-range antenna;
        a long-range antenna;
        an application stored in the non-transitory memory that is operable to:
            detect and intercept a network access attempt by the mobile communication device to establish a wireless communication session on the wireless communication network via long-range connection without the access point,
            before the wireless communication session is independently established by the mobile communication device via long-range connection, request, from the mobile communication device, indicia of the mobile communication device for establishing the long-range connection from the access point instead of the mobile communication device,
            receive the indicia from the mobile communication device, and
            assume, via use of the indicia, the identity of the mobile communication device such that the access point completes the establishment of the wireless communication session instead of the mobile communication device;
        an access point transceiver configured to:
            communicatively couple, via the short-range antenna, to the mobile communication device to establish a short-range connection between the mobile communication device and the access point,
            present, to the wireless communication network the assumed identity of the mobile communication device, and
            communicatively couple, via the long-range antenna, to the wireless communication network under the assumed identity of the mobile communication device such that the long-range connection is established between the access point and the wireless communication network instead of directly with the mobile communication device; and
        a temporary memory configured to store the identity of the mobile communication device while the access point transceiver is communicatively coupled to the mobile communication device and delete the stored indicia of the mobile communication device when the mobile communication device is no longer communicatively coupled to the access point,
    wherein the application is further operable to:
        enable the mobile communication device to conduct and complete the wireless communication session that includes one or more of a voice communication, a web browser session, or a text message communication, wherein a content of the wireless communication session is one of received by the access point transceiver from the mobile communication device via the short-range connection and transmitted by the access point transceiver via the long-range connection to the wireless communication network or received by the access point transceiver from the wireless communication network via the long-range connection and transmitted by the access point transceiver via the short-range connection to the mobile communication device for presentation by the mobile communication device, and wherein the assumed identity of the mobile communication device is used by the access point to establish the long-range connection and the use of the assumed identity masks the existence of the access point from the wireless communication network; and
        terminate the assumption of the identity of the mobile communication device upon termination of the wireless communication session.

2. The system of claim 1, wherein the long-range antenna is configured to communicate over a wireless network.

3. The system of claim 1, wherein the short-range antenna is configured to permit the access point transceiver to communicatively couple to the mobile communication device while the mobile communication device is proximate to the access point.

4. The system of claim 1, wherein the identity of the mobile communication device is one or more of a media access control (MAC) address, a mobile equipment identifier (MEID), a mobile station identifier (MSID), a mobile directory number (MDN), a network access identifier (NAI), and a password.

5. The system of claim 1, wherein the temporary memory is further configured to irreversibly erase the stored identity of the mobile communication device when the mobile communication device is no longer communicatively coupled to the access point transceiver.

6. The system of claim 1, wherein assuming the identity of the mobile communication device comprises accessing assets of the mobile communication device.

7. The system of claim 6, wherein the assets of the mobile communication device comprise the address book of the mobile communication device and the history of the mobile communication device.

8. A method of connecting a mobile communication device to a wireless communication network comprising:
    detecting and intercepting, by an access point, a request from a mobile communication device to access a wireless communication network and establish a wireless communication session via long-range connection;
    communicatively coupling, by the access point, to the mobile communication device to establish a short-range connection between the mobile communication device and the access point;

before the mobile communication device independently accesses the wireless communication network via the long-range connection, requesting, by the access point, indicia of the mobile communication from the mobile communication device;

receiving, by the access point, the indicia from the mobile communication device;

assuming, by the access point via use of the indicia, the identity of the mobile communication device such that the access point completes the establishment of the wireless communication session instead of the mobile communication device;

storing, by the access point in a temporary memory of the access point, the indicia of the mobile communication device while the mobile communication device is communicatively coupled to the access point;

presenting, by the access point, to the wireless communication network the assumed identity of the mobile communication device;

communicatively coupling, by the access point, to the wireless communication network under the assumed identity of the mobile communication device such that the long-range connection is established between the access point and the wireless communication network instead of directly with the mobile communication device;

enabling, by the access point, the mobile communication device to conduct and complete the wireless communication session that includes one or more of a voice communication, a web browser session, or a text message communication, wherein a content of the wireless communication session is one of received by the access point transceiver from the mobile communication device via the short-range connection and transmitted by the access point transceiver via the long-range connection to the wireless communication network or received by the access point transceiver from the wireless communication network via the long-range connection and transmitted by the access point transceiver via the short-range connection to the mobile communication device for presentation by the mobile communication device, and wherein the assumed identity of the mobile communication device is used by the access point to establish the long-range connection and the use of the assumed identity masks the existence of the access point from the wireless communication network;

terminating, by the access point, the assumption of the identity of the mobile communication device upon termination of the wireless communication session; and deleting, by the access point, the stored indicia of the mobile communication device from the temporary memory of the access point when the mobile communication device is no longer proximate to the access point.

9. The method of claim 8, wherein the indicia of the mobile communication device is one or more of a media access control (MAC) address, a mobile equipment identifier (MEID), a mobile station identifier (MSID), a mobile directory number (MDN), a network access identifier (NAI), and a password.

10. The method of claim 8, wherein assuming the identity of the mobile communication device comprises presenting, by the access point, the indicia of the communication device to the wireless communication network such that the wireless communication network perceives that the wireless communication device is making a request to connect to the wireless communication network.

11. The method of claim 8, wherein deleting the stored indicia of the mobile communication device comprises irreversibly removing the stored indicia of the mobile communication device from the temporary memory.

12. The method of claim 8, wherein terminating the wireless communication session comprises one or more of exiting a web browser, ending a phone call, and exiting an email server.

13. The method of claim 8, wherein assuming the identity of the mobile communication device further comprises accessing assets of the mobile communication device.

14. The method of claim 13, wherein the assets of the mobile communication device comprise the history of the mobile communication device and the address book of the mobile communication device.

15. The method of claim 8, wherein communicatively coupling is a reduced-power coupling conducted between the access point and the mobile communication device.

16. The method of claim 8, wherein the wireless communication session is a higher-power connection between the access point and the wireless communication network.

17. A method of connecting a mobile communication device to a wireless communication network comprising:

detecting and intercepting, by an access point, a request from a mobile communication device to access a wireless communication network and establish a wireless communication session via long-range connection;

coupling communicatively, by the access point, to the mobile communication device to establish a short-range connection between the mobile communication device and the access point;

before the mobile communication device independently accesses the wireless communication network via the long-range connection, requesting, by the access point, an indicia of the mobile communication device from the mobile communication device;

storing, by the access point, in a temporary memory of the access point, the indicia of the mobile communication device while the mobile communication device is proximate to the access point;

assuming, by the access point via use of the indicia, the identity of the mobile communication device such that the access point completes the establishment of the wireless communication session instead of the mobile communication device;

accessing, by the access point, a history of the mobile communication device;

accessing, by the access point, an address book of the mobile communication device;

presenting, by the access point to the wireless communication network, the assumed identity of the mobile communication device;

coupling communicatively, by the access point, to the wireless communication network under the assumed identity of the mobile communication device such that the long-range connection is established between the access point and the wireless communication network instead of directly with the mobile communication device;

enabling, by the access point, the mobile communication device to conduct and complete the wireless communication session that includes one or more of a voice communication, a web browser session, or a text message communication, wherein a content of the wireless communication session is one of received by the access point transceiver from the mobile communication device via the short-range connection and transmitted by the access point transceiver via the long-range connection to the wireless communication network or received by the access point transceiver from the wireless communication network via the long-range connection and transmitted by the access point transceiver via the short-range connection to the mobile communication device for presentation by the mobile communication device, and wherein the assumed identity of the mobile communication device is used by the access point to establish the long-range connection and the use of the assumed identity masks the existence of the access point from the wireless communication network; and deleting, by the access point, the indicia of the mobile communication device from the temporary memory of the access point when the mobile communication device is no longer communicatively coupled to the access point.

18. The method of claim 17, wherein the history of the mobile communication device comprises previous incoming and outgoing phone calls.

19. The method of claim 17, wherein the communicative coupling between the access point and the mobile communication device terminates when a distance between the access point and the mobile communication device exceeds a maximum range of communication between the access point and the mobile communication device.

* * * * *